United States Patent
Tokui

(10) Patent No.: US 9,635,311 B2
(45) Date of Patent: Apr. 25, 2017

(54) IMAGE DISPLAY APPARATUS AND IMAGE PROCESSING DEVICE

(71) Applicant: Sharp Kabushiki Kaisha, Osaka-shi, Osaka (JP)

(72) Inventor: Nao Tokui, Osaka (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/021,968

(22) PCT Filed: Aug. 27, 2014

(86) PCT No.: PCT/JP2014/072359
§ 371 (c)(1),
(2) Date: Mar. 15, 2016

(87) PCT Pub. No.: WO2015/045713
PCT Pub. Date: Apr. 2, 2015

(65) Prior Publication Data
US 2016/0255303 A1 Sep. 1, 2016

(30) Foreign Application Priority Data
Sep. 24, 2013 (JP) ................................ 2013-196627

(51) Int. Cl.
| | | |
|---|---|---|
| *H04N 7/14* | (2006.01) | |
| *H04N 21/4223* | (2011.01) | |
| *H04N 5/232* | (2006.01) | |
| *G06K 9/00* | (2006.01) | |
| *G06T 3/20* | (2006.01) | |
| *G06T 7/73* | (2017.01) | |

(52) U.S. Cl.
CPC ........... *H04N 7/14* (2013.01); *G06K 9/00268* (2013.01); *G06T 3/20* (2013.01); *G06T 7/75* (2017.01); *H04N 5/23219* (2013.01); *H04N 5/23229* (2013.01); *H04N 5/23293* (2013.01); *H04N 7/147* (2013.01); *H04N 21/4223* (2013.01); *G06T 2207/30201* (2013.01); *H04N 2007/145* (2013.01)

(58) Field of Classification Search
None
See application file for complete search history.

(56) References Cited

U.S. PATENT DOCUMENTS

| | | | |
|---|---|---|---|
| 8,204,312 B2 * | 6/2012 | Irie | G06K 9/00261 382/190 |
| 9,253,480 B2 * | 2/2016 | Ohba | G02B 27/2214 |
| 2012/0229448 A1 * | 9/2012 | Matsunaga | A63F 13/06 345/419 |
| 2013/0027393 A1 * | 1/2013 | Fujiwara | G06T 15/20 345/419 |
| 2014/0002586 A1 * | 1/2014 | Nourbakhsh | H04N 7/144 348/14.16 |
| 2014/0049667 A1 * | 2/2014 | Robinson | H04N 5/23293 348/262 |

FOREIGN PATENT DOCUMENTS

| | | |
|---|---|---|
| JP | 2005-092657 A | 4/2005 |
| JP | 2009-246408 A | 10/2009 |
| JP | 2012-227830 A | 11/2012 |

OTHER PUBLICATIONS

Official Communication issued in International Patent Application No. PCT/JP2014/072359, mailed on Nov. 11, 2014.

* cited by examiner

*Primary Examiner* — Creighton Smith
(74) *Attorney, Agent, or Firm* — Keating & Bennett, LLP

(57) ABSTRACT

Disclosed is an image processing device including a face information detection unit that detects face position information and face size information of a subject from an inputted image, a line-of-sight information calculation unit that calculates line-of-sight information of the subject, a face model generation unit that generates a face model of the subject using the face position information, the face size information, and three-dimensional facial shape template information representing a three-dimensional shape of a face, and an image generation unit that generates an image by correcting a line-of-sight direction of the subject to be directed to an imaging unit on the basis of the line-of-sight information and the face model. The line-of-sight information calculation unit calculates the line-of-sight information of the subject from the face position information and the face size information.

9 Claims, 18 Drawing Sheets

FIG. 4
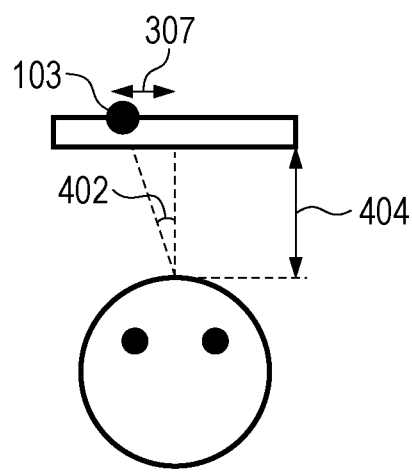
(a)
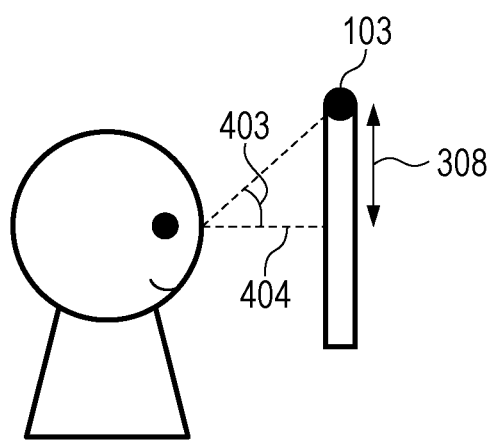
(b)

(a) INPUT IMAGE (b) FACE MODEL (a)
INPUT IMAGE (b)
LINE-OF-SIGHT
CORRECTED IMAGE (a)            (b)

FIG. 15
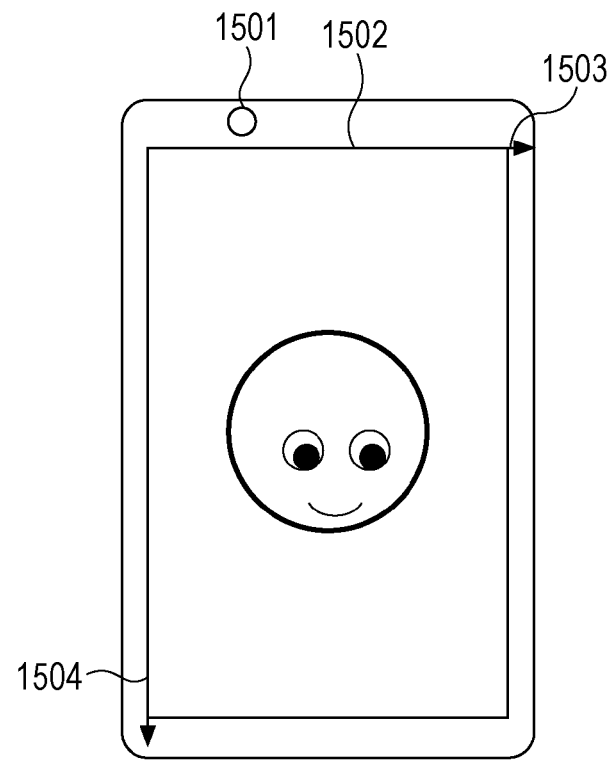
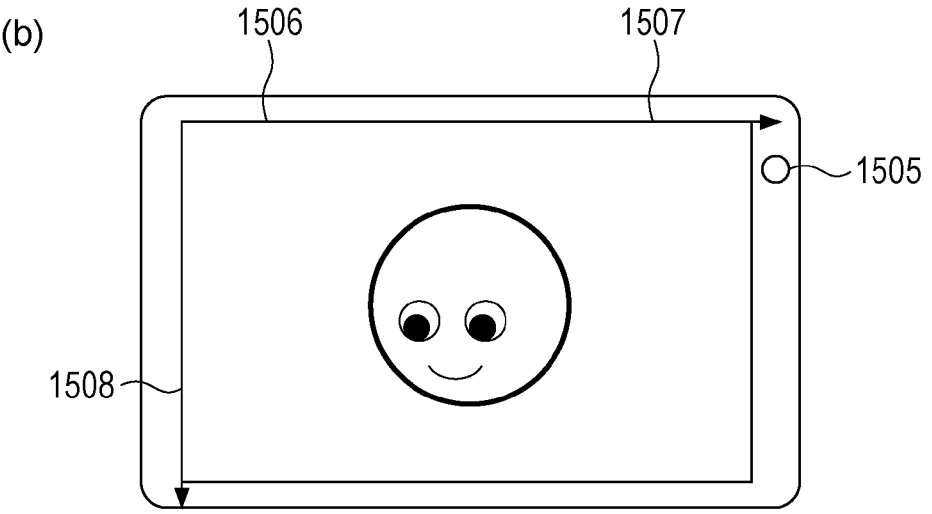

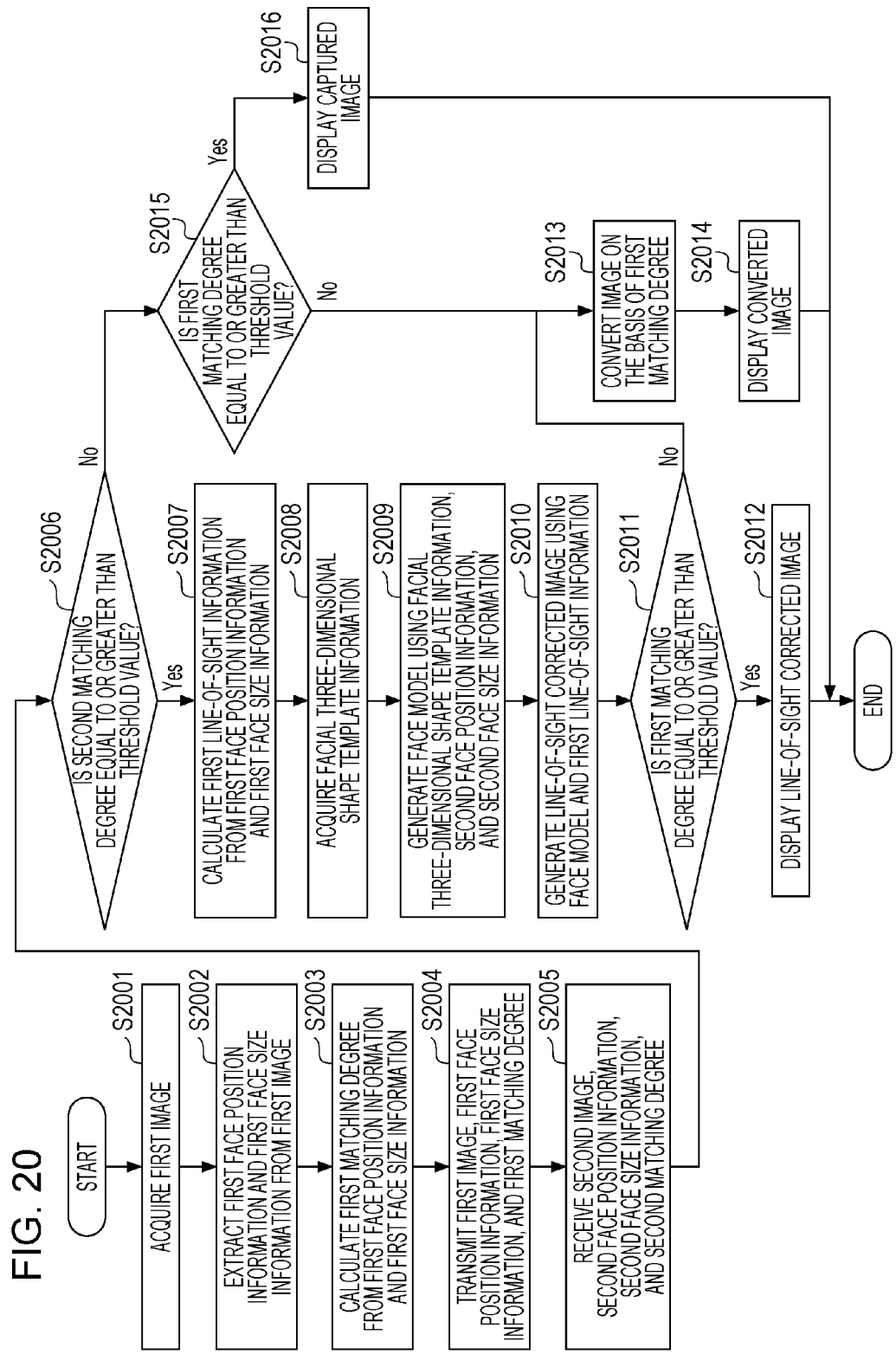

IMAGE DISPLAY APPARATUS AND IMAGE PROCESSING DEVICE

TECHNICAL FIELD

The present invention relates to an image processing device that generates a suitable image in a case where an imaging direction of an imaging unit and a display direction of a display unit are aligned with each other, and an image display apparatus that includes the image processing device.

BACKGROUND ART

There is a method that sets an imaging direction of an imaging unit and a display direction of a display unit to be the same direction and captures an image of a user's face as a subject in various kinds of displays such as a mobile phone, a tablet, a notebook PC, a television, or the like.

The following two applications are representative applications of the method. One application is a mirror function that inverts a captured image in a horizontal direction to be displayed as a mirror image that enables a user to apply makeup while checking his/her face. The other application is a video chat function or a video conference function that displays the captured image on a display held by a counterpart located at a remote site to allow communication with the counterpart located at a remote site.

Since a user's face is displayed on the display unit in the mirror function and the face of a counterpart is displayed on the display unit in the video chat function, a user watches the display unit, but not the imaging unit. Since a line-of-sight direction of a subject whose image is captured does not match with an imaging direction of the imaging unit, the subject whose image is captured is not directed to a front side and the line-of-sight of the counterpart located at a remote site or the subject viewing the captured image does not match with the line-of-sight of the subject in the captured image. For example, PTL 1 discloses a method that changes the positions of an iris and a pupil by changing pixels of a palpebral fissure region (an exposed region of an eyeball) of a person included in image data so that the line-of-sight of the person included in the inputted image data is directed to the front side of image data, as a method of correcting the line-of-sight direction of the subject.

CITATION LIST

Patent Literature

PTL 1: Japanese Unexamined Patent Application Publication No. 2009-246408

DISCLOSURE OF INVENTION

Technical Problem

However, in the above-described method, disposition positions of an iris model and a pupil model are determined on the basis of a difference between the direction of face vector and a front direction of image data so that line-of-sight of a user is directed to the front of image data. Accordingly, an image in which line-of-sight is directed to the right or left side is generated in a case where a face direction and a line-of-sight direction are different from each other, for example, in a case where a face is directed to the right or left side but line-of-sight is directed to the front side, or the like, and it is difficult to generate a suitable image.

The present invention has been made in an effort to solve the problems described above and intends to provide an image processing device that generates a suitable image in a case where an imaging direction of an imaging unit and a display direction of a display unit are aligned with each other.

Solution to Problem

According to an aspect of the present invention, there is provided an image processing device that includes a face information detection unit that detects face position information and face size information of a subject from an inputted image, a line-of-sight information calculation unit that calculates line-of-sight information of the subject, a face model generation unit that generates a face model of the subject using the face position information, the face size information, and three-dimensional facial shape template information representing a three-dimensional shape of a face, and an image generation unit that generates an image by correcting a line-of-sight direction of the subject to be directed to an imaging unit on the basis of the line-of-sight information and the face model, and the line-of-sight information calculation unit calculates the line-of-sight information of the subject from the face position information and the face size information.

On the assumption that a user views an area in the vicinity of an eye region in an image displayed on the display unit, line-of-sight information of the user can be calculated from a position of the eye region of a subject in the image.

This application claims the benefit of Japanese Priority Patent Application 2013-196627, the entire contents described in the specification and/or the drawings of which are incorporated herein by reference.

Advantageous Effects of Invention

According to the present invention, it is possible to generate an image by changing a line-of-sight direction according to the line-of-sight direction of a subject in a case where an imaging direction of an imaging unit and a display direction of a display unit are aligned with each other and thus it is possible to generate a suitable image.

BRIEF DESCRIPTION OF DRAWINGS

FIG. 4 is a diagram for explaining deviation between an imaging direction and a line-of-sight direction of a user.

FIG. 15 is a diagram representing a relationship between the X and Y axis of the image and the axes indicating angles of inclination of the image display apparatus according to the third embodiment.

FIG. 20 is a flow chart illustrating a flow of image processing in the fifth embodiment of the present invention.

DESCRIPTION OF EMBODIMENTS

Hereinafter, embodiments of the present invention will be described with reference to the accompanying drawings. The accompanying drawings illustrate specific embodiments and mounting examples according to a principle of the invention, however, these embodiments and examples are intended to be used in interpreting the present invention but not to limit the invention. In addition, a configuration in each figure is exaggeratedly described so as to make it easier to understand the present invention, and a scale of components and a size thereof illustrated in each figure are different from those in actuality.

First Embodiment

Figure 1:
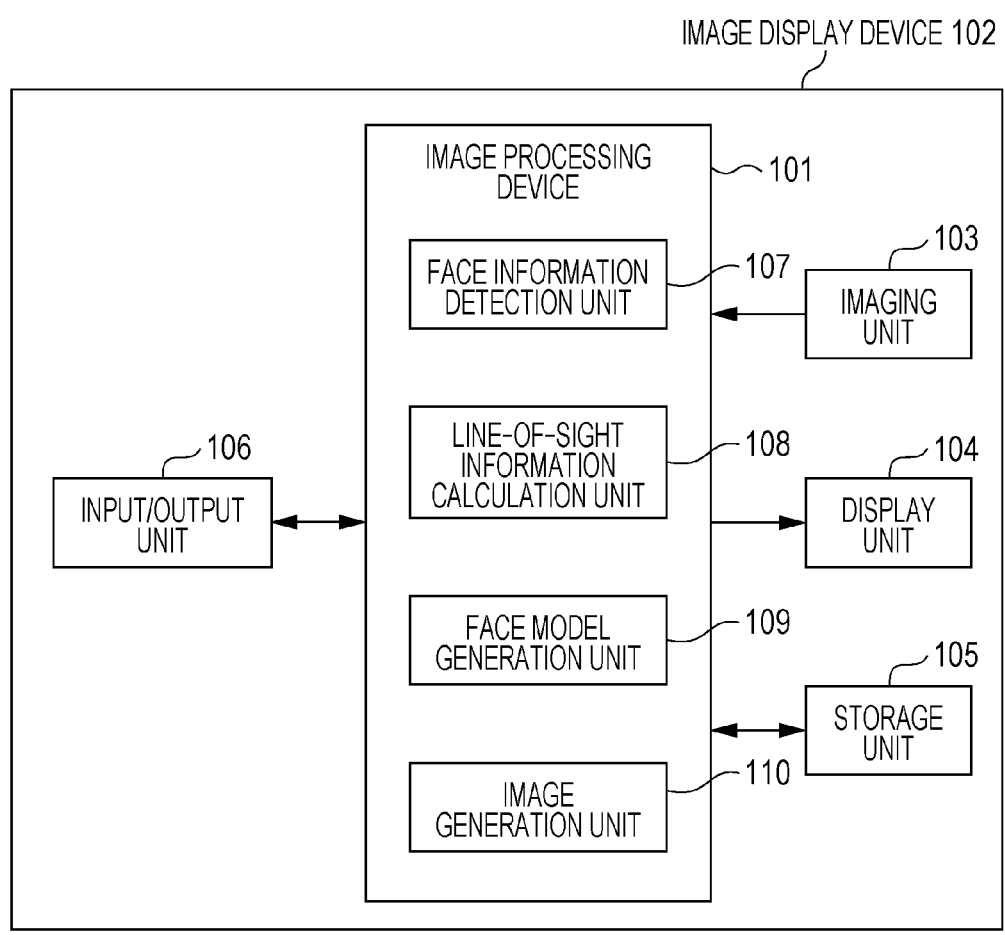
FIG. 1 is a functional block diagram illustrating an example of a configuration of an image display apparatus provided with an imaging unit and including an image processing device according to a first embodiment of the present invention.

FIG. 1 is a functional block diagram illustrating an example of a configuration of an image display apparatus 102 which includes an image processing device 101 according to an embodiment of the present invention, and illustrates an example in which a subject is imaged by an imaging unit 103 of the image display apparatus 102, a suitable image is generated from a captured image of the user, and the generated image is displayed on a display unit 104.

Hereinafter, a configuration example of a system of a first embodiment of the present invention and operations thereof will be described in detail with reference to FIG. 1. The image display apparatus 102 illustrated in FIG. 1 includes the imaging unit 103, the display unit 104, a storage unit 105, an image processing device 101, and an input/output unit 106.

The imaging unit 103 includes an imaging lens and an imaging element such as a Charge Coupled Device (CCD) or a Complementary Metal Oxide Semiconductor (CMOS), and is able to capture a still image or a moving image of a subject.

The display unit 104 is a display screen such as a Liquid Crystal Display (LCD) or an organic Electro Luminescence (EL) display, and displays image, information such as characters, a subject's image, or the like.

The image processing device 101 can be constituted by, for example, a Central Processing Unit (CPU), a Graphic Processing Unit (GPU), and the like, and acquires an image from the imaging unit 103, the storage unit 105, the input/output unit 106, or the like, and processes the image to output the processed image to the display unit 104, the storage unit 105, or the like.

In addition, the image processing device 101 includes a face information detection unit 107, a line-of-sight information calculation unit 108, a face model generation unit 109, and an image generation unit 110.

The face information detection unit 107 extracts face information (face position information and face size information of a subject) from an image inputted to the image processing device 101.

The line-of-sight information calculation unit 108 calculates line-of-sight information of a user on the basis of face information detected by the face information detection unit 107.

The face model generation unit 109 generates a face model according to a subject on the basis of the face information detected by the face information detection unit 107 and three-dimensional facial shape template information. The three-dimensional facial shape template information will be described later.

The image generation unit 110 generates an image by correcting a line-of-sight direction of a subject so that the line-of-sight direction of the subject matches with a line-of-sight direction of the imaging unit 103, on the basis of line-of-sight information of the subject and the face model.

The storage unit 105 is, for example, a flash memory or a hard disk, stores an image, three-dimensional facial shape template information, and the like, and stores equipment-specific data.

The input/output unit 106 is, for example, a set of key buttons, a sound input/output device such as a microphone, a speaker, or the like, and inputs instructions or sounds of a user to the image processing device or outputs sound.

The configuration example of a system according to the first embodiment has been described.

Next, operations of the image display apparatus 102 according to the first embodiment will be described in detail with reference to FIG. 2 to FIG. 7. First, a face detection operation will be described in detail with reference to FIG. 2.

Figure 2:
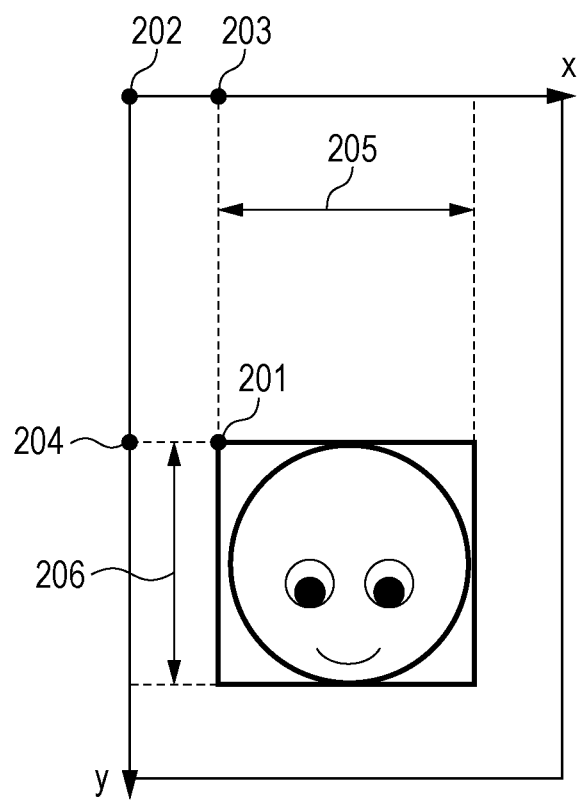
FIG. 2 is a diagram for explaining face size information and face position information detected by a face information detection unit.

FIG. 2 is a diagram for explaining face size information and face position information detected by the face information detection unit 107.

The face information detection unit 107 detects face position information and face size information from an image, as face information of a subject. The face position information corresponds to, for example, an upper left coordinate 201 of a detected face region. In a case where the horizontal direction of an image is set as the x-axis, the vertical direction thereof is set as the y-axis, and an upper left coordinate of the image is set as the origin 202 (x,y)= (0,0), the upper left coordinate 201 of a face region corresponds to a position which is (x,y)=(x-axis component 203, y-axis component 204). The face size information corresponds to the number of horizontal pixels 205 and the number of vertical pixels 206 of the detected face region.

As a method for detecting face position information and face size information from an image, there are known a method that detects a skin color considered a face color and that specifies a face region and a method that statistically obtains an identification function from learned samples of multiple face images and images (non-face) other than face images (see P. Viola and M. Jones, "Rapid object detection using a boosting cascade of simple features", Proc. IEEE Conf. CVPR, pp. 511-518, 2001), and the method of detecting face position information and face size information can be implemented using the above-described methods. In this manner, detection of the face position information and face size information is performed.

Figure 3:
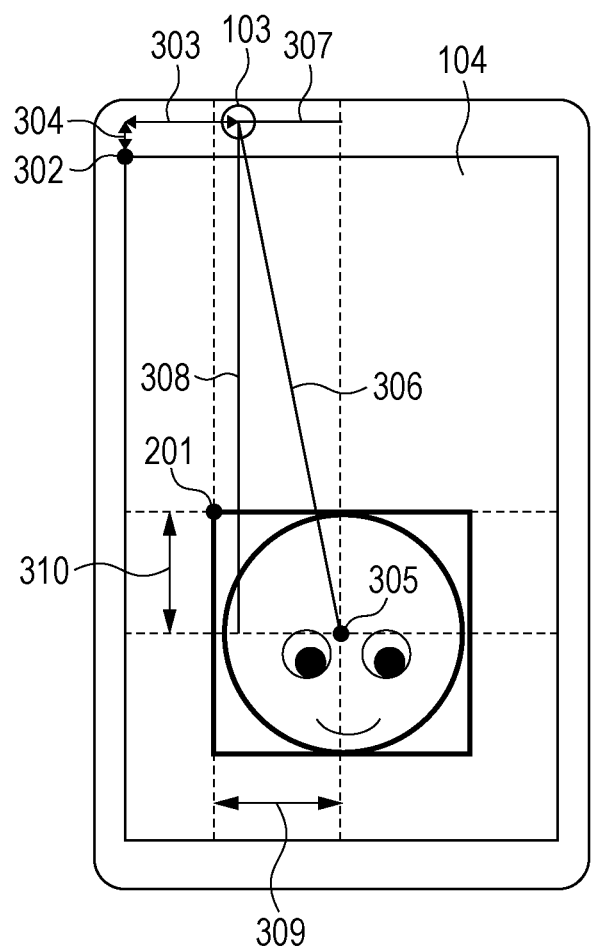
FIG. 3 is a diagram for explaining a relationship between an imaging unit and a line-of-sight position of a user.

Next, operations of the line-of-sight information calculation unit 108 will be described with reference to FIG. 3 and FIG. 4. FIG. 3 is a diagram for explaining a relationship between an imaging unit 103 and a line-of-sight position of a user. FIG. 4 is a diagram for explaining deviation between an imaging direction and a line-of-sight direction of a user.

The line-of-sight information calculation unit 108 calculates the line-of-sight information of the user from a position of an eye region of a subject in an image on the assumption that the user views an area in the vicinity of the eye region in the image displayed on the display unit 104. That is, it is assumed that a user views his/her face displayed on the display unit 104 using the mirror function and it is assumed that a user views a counterpart's face displayed on the display unit 104 using the video chat function. Line-of-sight information of the user is calculated on the basis of a relationship between the imaging unit 103 and the display unit 104, display parameters, and face information detected by the face information detection unit 107. The relationship between the imaging unit 103 and the display unit 104 is represented by an X-axis component $G_x$ 303 [mm] and a Y-axis component $G_y$ 304 [mm] of a distance [mm] between the imaging unit 103 and the upper left coordinate 302 of the image. A display pixel pitch $p_d$ [mm/pixel] is used as the display parameter. An X-axis component $E_x$ 307 [mm] and a Y-axis component $E_y$ 308 [mm] of a distance E 306 [mm] between the imaging unit 103 and the line-of-sight position 305 of the user can be represented by the following Equations (1) and (2).

$$E_x = (F_x + W - E_{posx})p_d - G_x \quad (1)$$

$$E_y = (F_y + H - E_{poxy})p_d - G_y \quad (2)$$

Here, $E_{posx}$ [pixel] indicates a length 309 from the upper left coordinate 201 of the face region to a center position of the eye region of a subject in the X-axis direction. $E_{poxy}$ [pixel] indicates a length 310 from the upper left coordinate 201 of the face region to a center position 305 of the eye region of a subject in the Y-axis direction. Since the center position 305 in the eye region of a face region varies in accordance with the method used for eye detection, initial values of $E_{posx}$ and $E_{poxy}$ correspond to a center position of the face region, and values of $E_{posx}$ and $E_{poxy}$ can be changed to respective arbitrary values. As such, the line-of-sight position of a user is represented as a distance from the imaging unit 103 and accordingly, it becomes easy to calculate deviation between an imaging direction of the imaging unit 103 and the line-of-sight direction of a user to be described later as an angle.

A method that represents deviation between an imaging direction of the imaging unit 103 and the line-of-sight direction of a user as an angle using the line-of-sight position $(E_x, E_y)$ 305 of the user calculated by the above-described method will be described. Deviation $\theta_x$ 402 in the horizontal direction and deviation $\theta_y$ 403 in the vertical direction between an imaging direction of the imaging unit 103 and the line-of-sight direction of a subject as illustrated in FIG. 4(a) and FIG. 4(b) can be calculated by the following Equations (3) and (4), respectively.

$$\theta_x = \arctan\left(\frac{E_x}{Z}\right) \quad (3)$$

$$\theta_y = \arctan\left(\frac{E_y}{Z}\right) \quad (4)$$

A distance between the image display apparatus 102 and a subject is set as a distance Z 404 [mm]. The distance Z 404 [mm] between the image display apparatus 102 and a subject can be calculated by Equation (5).

$$Z = \frac{HF}{2L \tan\frac{A}{2}} \quad (5)$$

The vertical resolution of the captured image is set as H [pixel], a face length stored in three-dimensional facial shape template information is set as F [mm], the number of vertical pixels of a face obtained from face size information is set as L [pixel], and an angle of view of a camera is set as A [mm]. By the above-described processing, the line-of-sight position $(E_x, E_y)$ of a user as line-of-sight information and the deviation angle $(\theta_x, \theta_y)$ between the imaging direction and the line-of-sight direction of the user are calculated, and the line-of-sight information and the deviation angle are output to an image generation unit.

Figure 5:
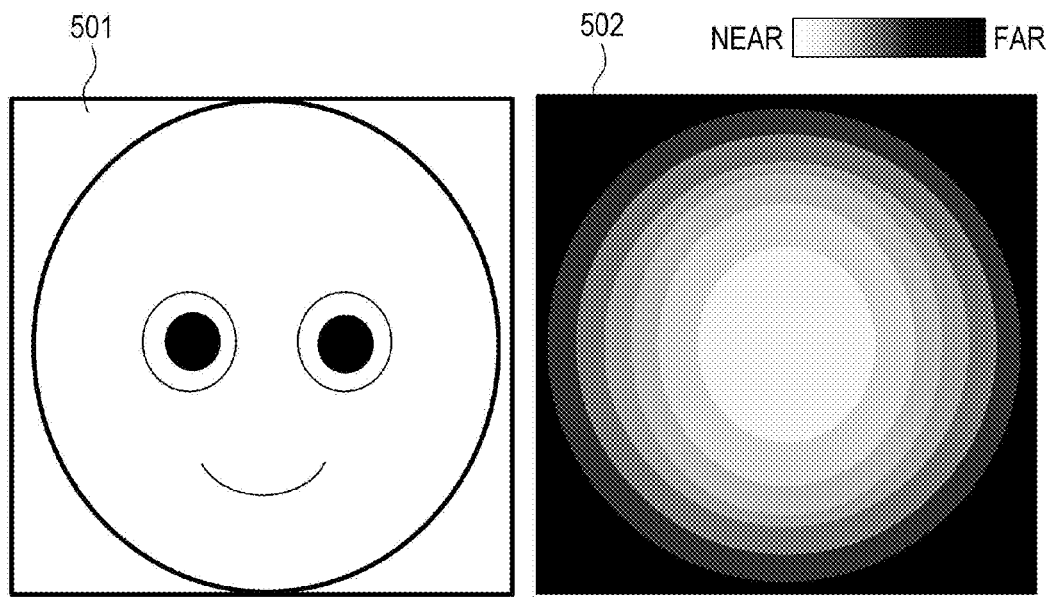
FIG. 5 is a diagram for explaining a face and three-dimensional facial shape template information corresponding to the face.
Figure 6:
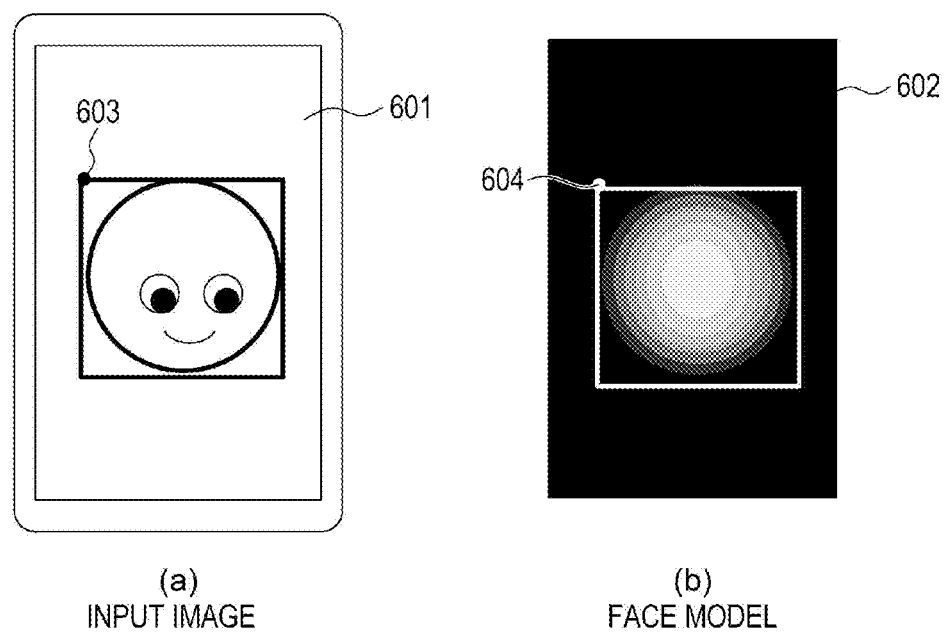
FIG. 6 is a diagram for explaining the input image and a face model corresponding to the input image.

Next, operations of face model generation will be described with reference to FIG. 5 and FIG. 6. FIG. 5 is a diagram for explaining a face and three-dimensional facial shape template information corresponding to the face. FIG. 6 is a diagram for explaining an input image and a face model corresponding to the input image. First, the three-dimensional facial shape template information which represents a three-dimensional facial shape used for generation of the face model will be described in detail. The three-dimensional facial shape template information corresponds to data 502 of the three-dimensional shape of a face 501 as illustrated in FIG. 5. A face of a subject is represented as a sphere for brevity. The three-dimensional facial shape template information corresponds to an average face of human faces and can be prepared by averaging the three-dimensional facial shapes acquired from a plurality of personal samples. In addition, the three-dimensional facial shape template information can be prepared using Computer Graphics (CG).

The three-dimensional facial shape template information 502 illustrated in FIG. 5 corresponds to an image obtained by storing a distance from the image display apparatus 102 to the face for each pixel and represents a three-dimensional facial shape using luminance values. The three-dimensional facial shape is represented by brighter pixels as a portion of a face approaches the image display apparatus and is represented by darker pixels as a portion of a face moves away from the image display apparatus. The face model is generated using the three-dimensional facial shape template information.

In the face model generation, the following two-stage processing is performed. In a first stage, an intermediate face model is generated by adjusting a distance histogram in the three-dimensional facial shape template information. The distance histogram is a histogram in which the horizontal axis denotes a distance and the vertical axis denotes an appearance frequency of distance. It is possible to visually recognize a distance distribution situation included in the three-dimensional facial shape template information by using the distance histogram. The face model is represented in such a way that a face widens as the distribution of the distance histogram is increased, and a face becomes thinner as the distribution of the distance histogram is reduced. In a second stage, vertical resolution and horizontal resolution of the intermediate face model are changed.

First, an adjustment method of the distance histogram of three-dimensional facial shape template information in the first stage will be described in detail. In the distance histogram of a face region of a subject, a maximum value and a minimum value vary according to a distance between the image display apparatus 102 and a subject, but a magnitude of the distribution does not vary. A distance between the image display apparatus 102 and the subject is set as a minimum value of the distance histogram, and a value obtained by adding a depth of a human face included in the three-dimensional facial shape template information to the minimum value is set as a maximum value in the distance histogram. In general, a distance from the apex of the nose to the back of the head is regarded as a depth of a human face. However, in many cases, the back of the head is an obstructed region and is not imaged in a case where the imaging unit 103 performs imaging. Therefore, in a case where a distance from the apex of the nose to a cheek is adopted as a depth of a human face, the amount of data to be held is decreased, which is preferable. A distance Z [mm] between the image display apparatus 102 and the subject is estimated from the number of vertical pixels L [pixels] of a face obtained from the face size information using Equation (5). By the above-described method, the distance between the image display apparatus 102 and the subject is calculated from detected face size information, and the maximum value and minimum value in the distance histogram in the intermediate face model are determined from the calculated distance between the image display apparatus 102 and the subject.

The maximum value and minimum value of the distance histogram of the three-dimensional facial shape template information is changed using the following Equation (6).

$$D' = \frac{R_{max} - R_{min}}{M_{max} - M_{min}} D + (M_{min} - R_{min})$$ (6)

Here, a variable D indicates a distance before the conversion, a variable D' indicates a distance after the conversion, a variable $M_{max}$ indicates a maximum value in the distance histogram before the change, a variable $M_{min}$ indicates a minimum value in the distance histogram before the change. A variable $R_{max}$ indicates a maximum value in the distance histogram after the change and a variable $R_{min}$ indicates a minimum value in the distance histogram after the change. By the above-described processing, the distance histogram of the three-dimensional facial shape template information is adjusted using the face size information, and the intermediate face model is generated.

Next, processing for changing the vertical resolution and the horizontal resolution of the intermediate face model in the second stage will be described in detail. The intermediate face model is enlarged or reduced so that the vertical resolution and horizontal resolution of the intermediate face model become equal to the vertical resolution and the horizontal resolution of the detected face region, respectively. That is, the intermediate face model is reduced in a case where the resolution of the detected face is higher than the resolution of the intermediate face model, and the intermediate face model is reduced in a case where the resolution of the detected face is lower than the resolution of the intermediate face model. The intermediate face model of which the size is changed to the same size as that of the face size information by the above-described enlargement and reduction processing is arranged in an image 602 having the same resolution as that of an image 601 so that an upper left coordinate 603 of a face region in the image 601 becomes equal to an upper left coordinate 604 of the intermediate face model. The image 602 obtained by arranging the intermediate face model is outputted to the image generation unit as a face model.

The above-described method is preferable since the face model of the subject can be generated with a simple system, and the face model can be utilized for generating a frontal face image of the subject without adding a new sensor to the image display apparatus 102 or to perform complex processing such as three-dimensional shape calculate processing in order to acquire a three-dimensional facial shape of a subject. In a case where three-dimensional facial shape template information and position information of face component information are detected and the face component information is detected by the face information detection unit 107, it is possible to modify the three-dimensional facial shape template information so that the position information of the face component information of the three-dimensional facial shape template information matches with the position information of the face component information of the detected face region, and it is possible to generate a line-of-sight corrected image with higher quality in image generation to be described later, which is preferable.

Figure 7:
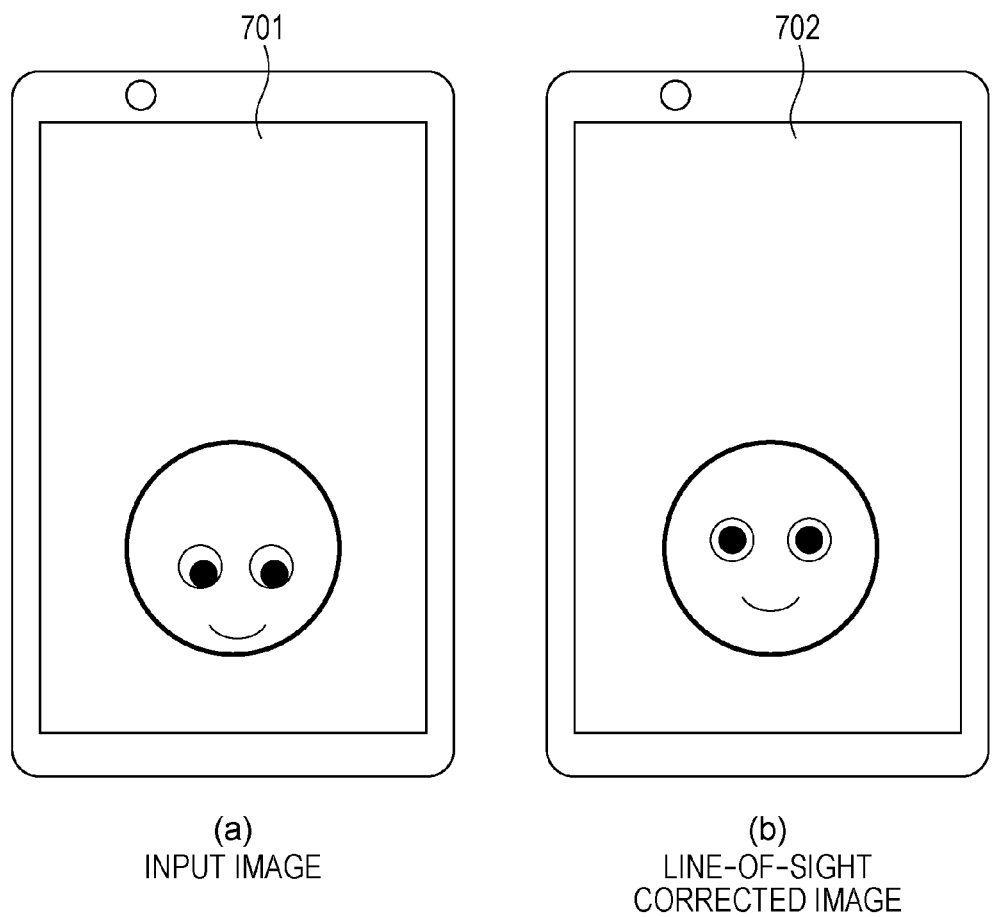
FIG. 7 is a diagram for explaining an input image and a line-of-sight corrected image.

Finally, operations of image generation will be described in detail with reference to FIG. 7. FIG. 7 is a diagram for explaining an input image (a) and a line-of-sight corrected image (b). The image generation unit 110 generates an image 702 in which line-of-sight of a subject is corrected using line-of-sight information, the face model, and an image 701. Next, a method of generating a line-of-sight corrected image will be described. Positions of respective pixels of the image 701 in a three-dimensional space are converted using the face model corresponding to the image 701, that is, distance data of a face to generate an image in which a line-of-sight direction is corrected. This position conversion in the three-dimensional space is performed on the basis of line-of-sight information. Pixels on an image are corrected in such a way that angular deviation in the horizontal direction is corrected based on deviation $\theta_x$ in the X-axis direction between a line-of-sight direction of a subject which is line-of-sight information and an imaging direction of the imaging unit 103 and angular deviation in the vertical direction is corrected based on deviation $\theta_y$ in the Y-axis direction between the line-of-sight direction of a subject and the imaging direction of the imaging unit 103.

In this manner, it is possible to generate a line-of-sight corrected image according to the line-of-sight direction of the subject by calculating line-of-sight information using face position information and face size information of a subject.

Figure 8:
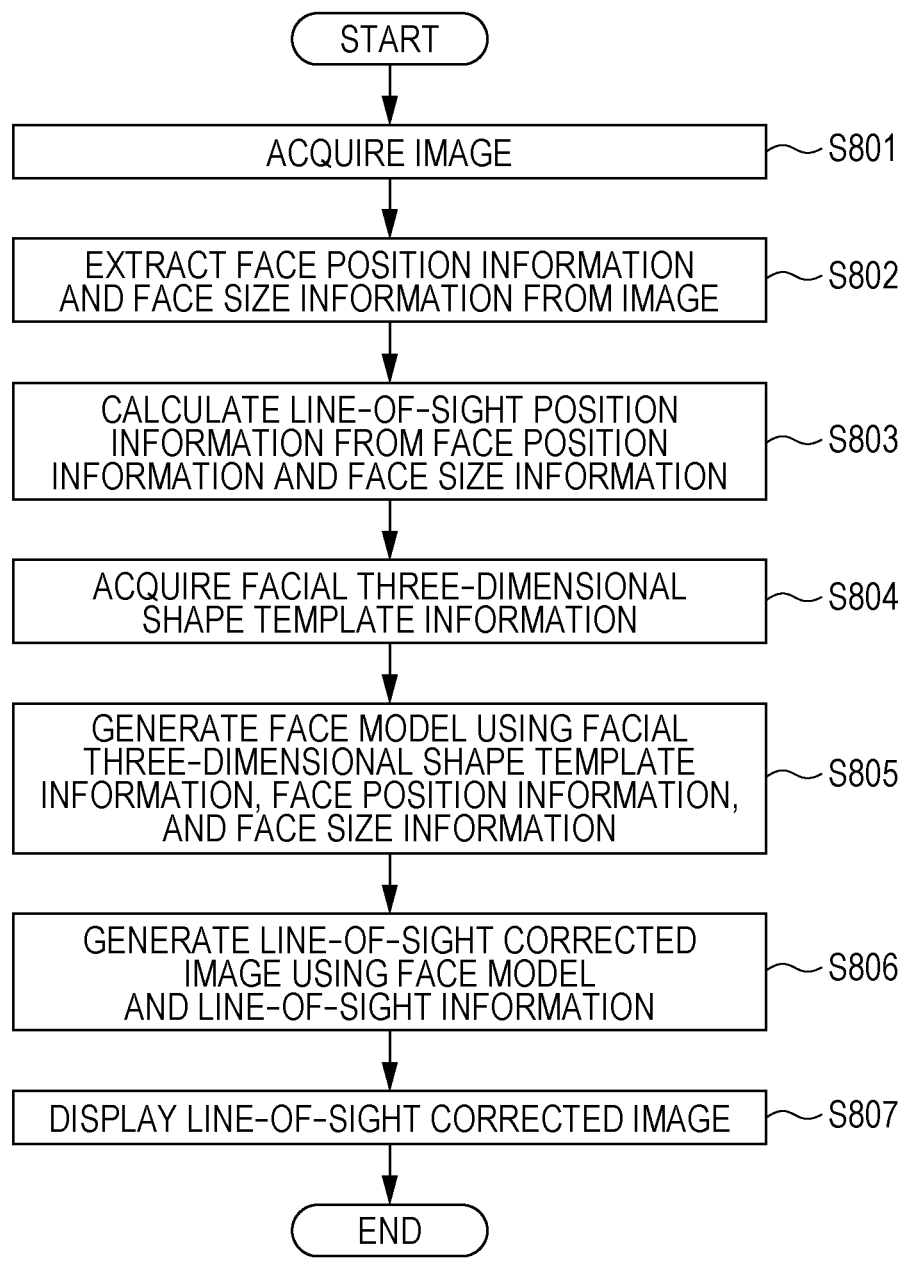
FIG. 8 is a flow chart illustrating a flow of image processing in the first embodiment of the present invention.

A flow of the operations described above will be described using a flowchart illustrated in FIG. 8.

First, in step S801, the image processing device 101 receives a captured image from the imaging unit 103. In step S802, the face information detection unit 107 detects face information such as face position information or face size information from the captured image (FIG. 3). In step S803, the line-of-sight information calculation unit 108 calculates line-of-sight information of a subject using face information (FIG. 4).

Next, in step S804, the image processing device 101 acquires three-dimensional facial shape template information from the storage unit 105 (FIG. 5). In step S805, a face model generation unit 109 performs face model generation. In the face model generation, the three-dimensional facial shape template information is converted on the basis of the face size information to generate a face model (FIG. 6).

Next, in step S806, the image generation unit 110 generates an image by changing the line-of-sight direction of a subject so that the line-of-sight direction of a subject in the captured image matches with an imaging direction of the imaging unit 103, using the face model and line-of-sight information (FIG. 7). In addition, in step S807, the image generation unit 110 outputs the generated image to the display unit 104. A flow of the operations of the image processing device 101 has been described. The image display apparatus 102 according to the first embodiment operates as described above.

According to the image display apparatus 102 provided with the image processing device 101 in the above-described embodiment, it is possible to appropriately perform the image processing according to the line-of-sight direction of the subject and to display a suitable image.

While descriptions in the embodiment have been made on a case where there is a single piece of three-dimensional facial shape template information, suitable three-dimensional facial shape template information may be selected from plural pieces of three-dimensional facial shape template information. For example, face information such as a width between eyes of a subject, arrangement of face component information, a face shape, and the like is analyzed and, an age, a three-dimensional facial shape such as a face shape, a depth of engraving, or the like is estimated from the detected face component information, face size information, and the like, and a three-dimensional facial shape template information closest to the estimated three-dimensional facial shape is selected. In this manner, the image processing is performed with three-dimensional facial shape template information suitable for a user. Therefore, it is possible to improve quality of the generated image, which is preferable.

In a case where there are at least two or more pieces of three-dimensional facial shape template information that are similar to the three-dimensional facial shape of a user, when intermediate three-dimensional facial shape template information which corresponds to intermediate information between two or more pieces of three-dimensional facial shape template information is generated, it is possible to generate a face model much suitable for the three-dimensional facial shape of a user, which is preferable. The intermediate three-dimensional facial shape template information is generated by applying morphing processing to two or more pieces of three-dimensional facial shape template information. In a case where the three-dimensional facial shape of a user has a degree of similarity of 45% to three-dimensional facial shape template information A and a degree of similarity of 55% to three-dimensional facial shape template information B, the morphing is applied based on the degree of similarity. Three-dimensional facial shape template information suitable for a user is generated by the morphing processing from plural pieces of three-dimensional facial shape template information and thus it is possible to generate a face model more suitable for a three-dimensional facial shape of a user, which is preferable.

Since selection of template information between three-dimensional facial shape template information A and three-dimensional facial shape template information B does not vary significantly, it is possible to reduce indistinctness occurring in a generated image by changing the selected template information abruptly, which is preferable. In addition, in a case where the degree of similarity is calculated for each piece of face component information of a user, it is possible to generate a face model much suitable for the three-dimensional facial shape of a user by using three-dimensional facial shape template information C for an eye shape, using three-dimensional facial shape template information D for a contour of a user's face, or the like, which is preferable.

Second Embodiment

Figure 9:
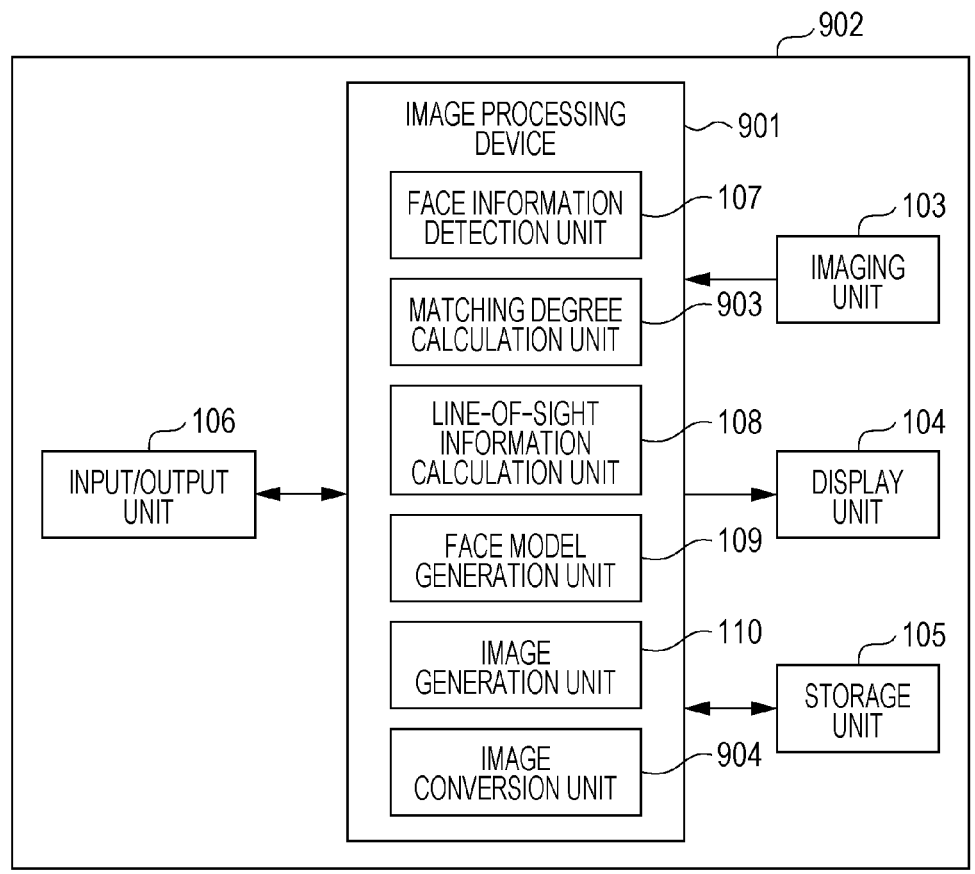
FIG. 9 is a functional block diagram illustrating an example of a configuration of an image display apparatus provided with an imaging unit and including an image processing device according to a second embodiment of the present invention.

Next, a configuration of an image display apparatus 902 provided with an image processing device 901 according to a second embodiment of the present invention will be described with reference to FIG. 9. In FIG. 9, the same constitutional elements as those of FIG. 1 are assigned the same reference numerals, and the same processing as the example in FIG. 9 is performed on the elements and thus, descriptions thereof will be omitted.

A difference between the present embodiment and the first embodiment is that the present embodiment has a configuration that includes a degree of suitability calculation unit 903 that calculates a degree indicating the extent to which a captured image is suitable for image composition processing and an image conversion unit 904 that converts an image on the basis of the degree of suitability calculated by the degree of suitability calculation unit.

Figure 10:
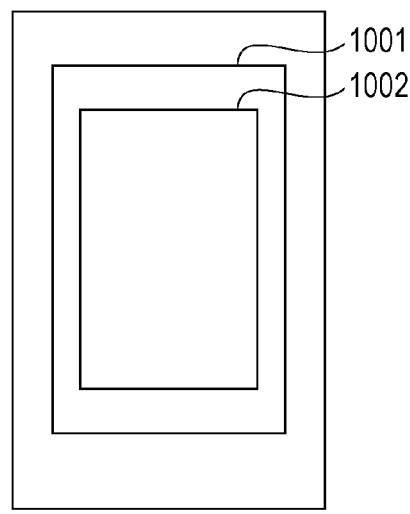
FIG. 10 is a diagram for explaining a region which is determined as being suitable for image generation.
Figure 11:
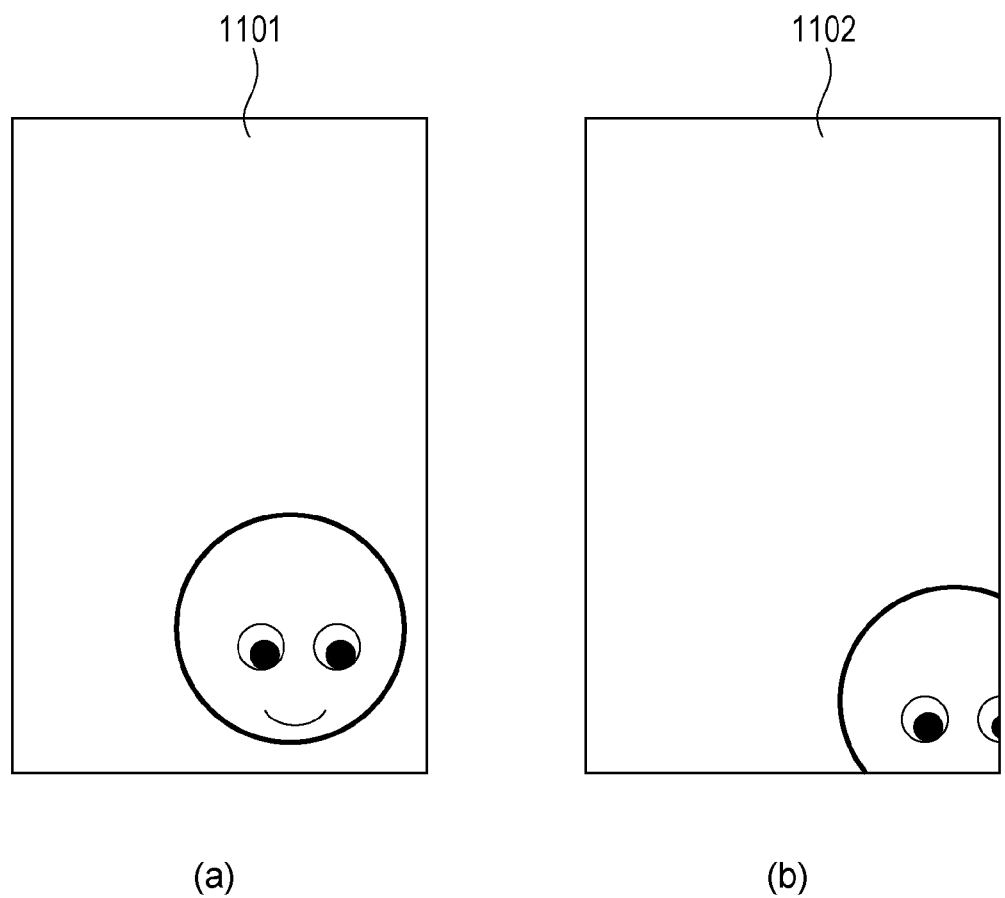
FIG. 11 is a diagram illustrating an example in which image conversion is performed using a degree of suitability.

Next, the operations of the image display apparatus 902 according to the second embodiment will be described in detail with reference to FIG. 10 and FIG. 11. First, operations of the degree of suitability calculation unit 903 will be described in detail with reference to FIG. 10. FIG. 10 is a diagram for explaining a region which is determined as being suitable for image generation.

The degree of suitability calculation unit 903 calculates a degree of suitability using face information. The degree of suitability is indicated by deviation information of a face region to the region which is determined as being suitable for image generation. The region determined as being suitable for image generation is a region 1001 of a center portion in the image in which face detection results can be stably acquired. In a case where the detected face region is included in the region 1001 in its entirety, the degree of suitability is set as a maximum value. In a case where a portion of the detected face region is included in the region 1001, the degree of suitability is reduced by the size of the region 1001 which is located outside the face region. In a case where the detected face region is not included in the region 1001, the degree of suitability is set as a minimum value.

In a case where the region determined as being suitable for image generation can be changed according to whether the generated image is displayed in the previous frame, it is possible to prevent that the generated image and the captured image are displayed by being frequently switched to each other even in a case where the degrees of suitability calculated from the detected face information are distributed close to the threshold value for determining whether or not image generation is performed, which is preferable. That is, if a region 1002 determined as being suitable for the image generation in a case the captured image is displayed in the previous frame and a region 1001 determined as being suitable for the image generation in a case where the generated image is displayed in the previous frame are set as different regions, it is possible to display a suitable image without causing the captured image and the generated image to be frequently switched to each other even in a case where the degree of suitability varies significantly for each frame, for example, a case where the detected face is present at an edge of the image. When the captured image and the generated image are displayed being switched with each other, or the generated image and the captured image are displayed being switched with each other, if an image which represents a state where deviation between the line-of-sight direction of a user and the imaging direction transitions, that is, a line-of-sight direction transition image is displayed between the captured image and the generated image, a change in the line-of-sight direction of the user is expressed as being smooth, which is preferable. In a case where switching from the captured image to the generated image is made, an image in which the line-of-sight direction is changed such that the deviation in the line-of-sight direction is changed from (0,0) to $(\theta_x, \theta_y)$ is generated as a line-of-sight transition image. On the contrary, in a case where switching from the generated image to the captured image is made, an image in which line-of-sight direction is changed such that the deviation in the line-of-sight direction is changed from $(\theta_x, \theta_y)$ to (0,0) is generated as a line-of-sight transition image.

In a case where the degree of suitability calculated as described above is used, it is possible to determine an image in which the face is detected, but which is unsuitable for image composition. In a case where a face detection operation becomes unstable due to a subject being located at an edge of a screen or the like, it is possible to prevent that the captured image and the generated image are displayed being frequently switched with each other, and to display a suitable image.

Next, the operations of the image conversion unit will be described in detail with reference to FIG. 11. FIG. 11 is a diagram illustrating an example in which image conversion is performed using a degree of suitability.

The image conversion unit converts an image using the face information and the degree of suitability and makes it possible for a user to easily capture a face image suitable for image composition. An image needs to be capture in such a manner that face region of a subject in an image is located at the center of the image in order to increase the degree of suitability. Accordingly, an image is converted using the face information and the degree of suitability. That is, for a case of an image 1101 (*a*) having a low degree of suitability in which the face region is located at lower right portion of the image, an image 1102 (*b*) having been translated downward-right is generated and displayed so as to prompt the user to move the display device downward-right. The movement direction is determined by face position information. In a case where the face region is displayed on an upper portion, the image is translated upward, and in a case where the face region is displayed on a left portion, the image is translated leftward. In this case, if an image which represents a state where the transition from the captured image to the translated image is made, that is, a translation transition image is displayed, a movement of the face of the user is viewed as being smooth and thus, it becomes easier to recognize the movement direction, which is preferable.

In a case where the image converted as described above is used, it is possible to inform a user that the image is an image in which the face is detected, but which is unsuitable for image composition, and it is possible to prompt a user to capture an image which is suitable for image composition.

Figure 12:
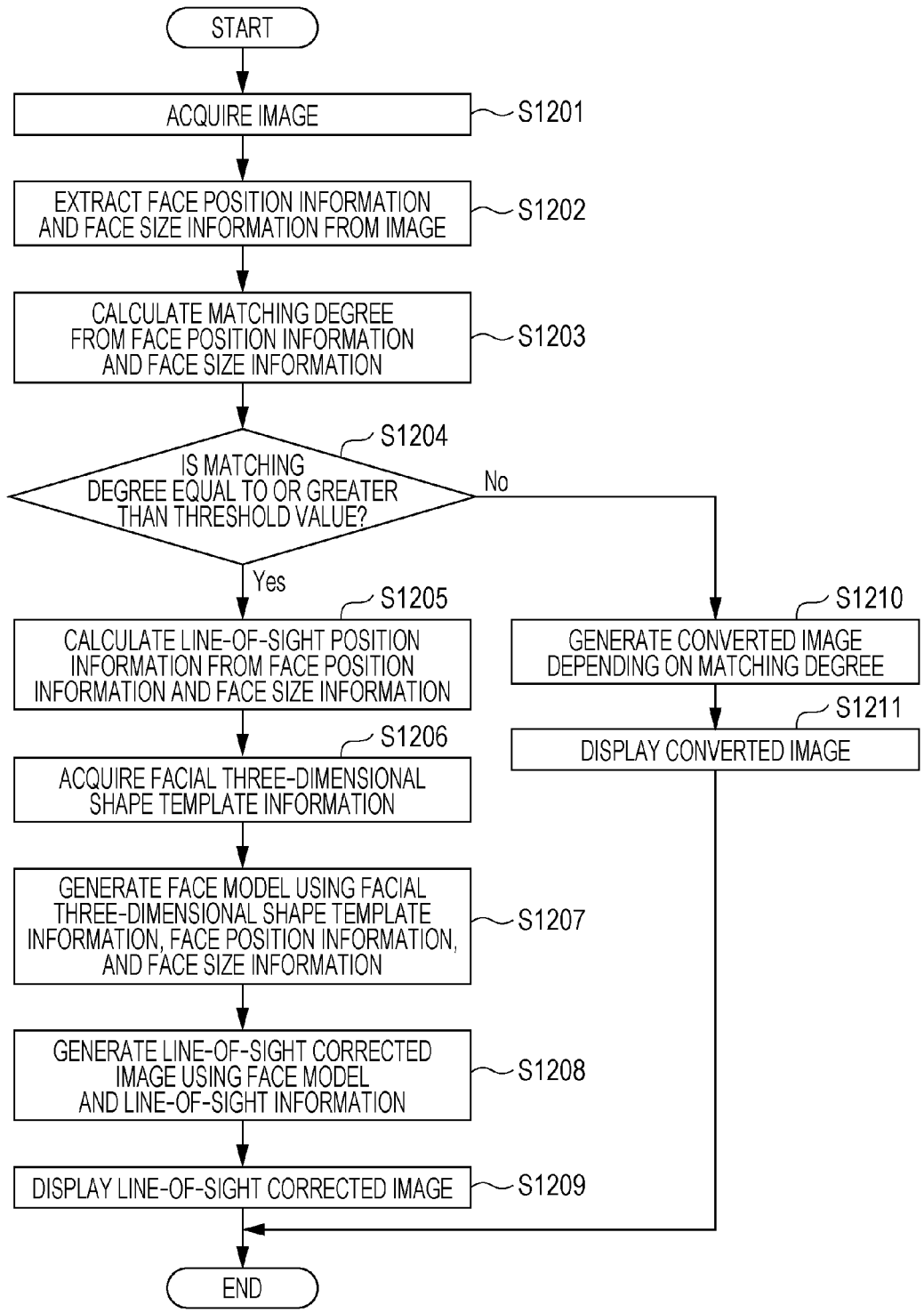
FIG. 12 is a flow chart illustrating a flow of image processing in the second embodiment of the present invention.

A flow of the operations described above will be described using a flowchart illustrated in FIG. 12.

First, in step S1201, the image processing device 901 receives a captured image from the imaging unit 103. In step S1202, the face information detection unit 107 detects face information such as face size information and face position information from the captured image. In step S1203, the degree of suitability calculation unit 903 calculates a degree of suitability of a subject's face image using the face information.

In step S1204, it is determined whether or not the degree of suitability is equal to or greater than a threshold value. In a case where it is determined that the degree of suitability is equal to or greater than the threshold value (Yes), step S1205 to step S1209 are performed. In a case where it is determined that the degree of suitability is less than the threshold value (No), step S1210 and step S1211 are performed. First, the operations in a case where the degree of suitability is determined as being equal to or greater than a threshold value will be described. In step S1205, the line-of-sight information calculation unit 108 calculates line-of-sight information of the subject using face information. In step S1206, the image processing device 901 acquires three-dimensional facial shape template information from the storage unit 105. In step S1207, the face model generation unit 109 generates a face model. In the face model generation, the three-dimensional facial shape template information is converted on the basis of the face size information to generate the face model. In step S1208, the image generation unit 110 generates an image by changing the line-of-sight direction of a subject so that the line-of-sight direction of a subject in the captured image matches with the imaging direction, using the face model and the line-of-sight information. In step S1209, the image generation unit 110 outputs the generated image to the display unit 104. The operations in a case where the degree of suitability is determined as being less than a threshold value will be described. First, in step S1210, the image conversion unit 904 converts an image so that a user easily captures an image suitable for image generation, that is, a user easily captures an image with a high degree of suitability, using face information and the degree of suitability. In step S1211, the image conversion unit 904 displays the converted image on the display unit 104. A flow of the operations of the image processing device 901 has been described above. The image display apparatus 902 according to the second embodiment operates as described above.

According to the image display apparatus 902 provided with the image processing device 901 in the present invention, it is determined whether an image is suitable for image generation, the generated image is displayed in a case where the image is suitable for image generation, and the captured image is displayed in a case where the image is not suitable for image generation, such that the generated image and the captured image are displayed being appropriately switched to each other and thus it is possible to prevent the unsuitable image from being displayed. Therefore, it is possible to display the suitable image. Furthermore, the captured image is displayed after being subjected to the translation so that the user easily generates an image suitable for image generation, and thus it is possible to capture a suitable image.

In the present embodiment, the image conversion unit 904 performs translation on the captured image using the degree of suitability. However, the image conversion unit 904 may output an image obtained by superimposing the degree of suitability on the top, bottom, right and left portions of the face region of the subject as a converted image. In a case where the degree of suitability is superimposed on the captured image, whether a user has captured an image suitable for image generation is easily and visually recognizable, which is preferable.

Third Embodiment

Figure 13:
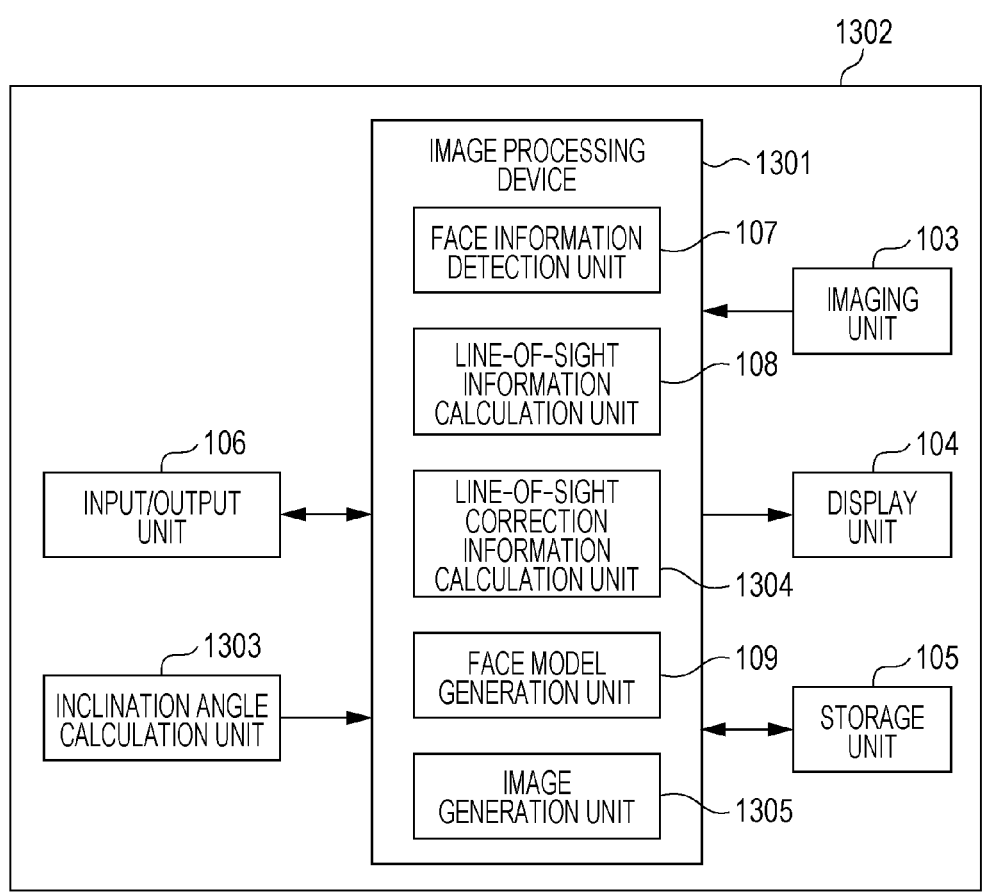
FIG. 13 is a functional block diagram illustrating an example of a configuration of an image display apparatus provided with an imaging unit and including an image processing device according to a third embodiment of the present invention.

Next, a configuration of an image display apparatus 1302 provided with an image processing device 1301 according to a third embodiment of the present invention will be described with reference to FIG. 13. In FIG. 13, the same constitutional elements as those of FIG. 1 are assigned the same reference numerals, the same processing as the embodiment of FIG. 13 is performed on the elements and thus, descriptions thereof will be omitted.

A difference between the present embodiment and the first embodiment is that the present embodiment has a configuration that includes an inclination angle detection unit 1303 that detects an inclination angle of the image display apparatus 1302 and a line-of-sight correction information calculation unit 1304 that calculates correction information of a line-of-sight direction of a subject according to the inclination angle of the image display apparatus 1302. The inclination angle detection unit 1303 inputs an inclination of the image display apparatus 1302 to the line-of-sight correction information calculation unit 1304. The line-of-sight correction information calculation unit 1304 calculates correction information of the line-of-sight direction of a subject according to the inclination of the image display apparatus 1302 and outputs the correction information of the line-of-sight direction to an image generation unit 1305. The image generation unit 1305 generates an image in which the line-of-sight direction of a subject is corrected on the basis of line-of-sight information and line-of-sight correction information.

Figure 14:
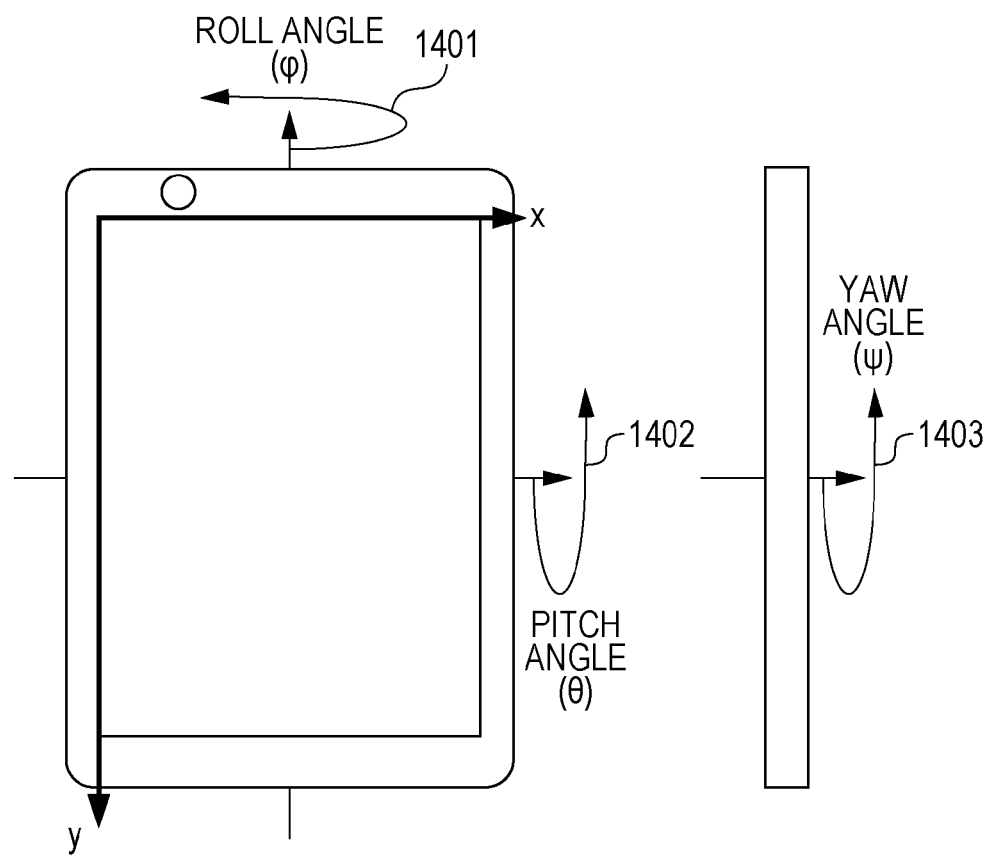
FIG. 14 is a diagram representing the axes indicating angles of inclination of the image display apparatus according to the third embodiment.

The operations of the image display apparatus 1302 according to the third embodiment will be described in detail with reference to FIG. 14 and FIG. 15. First, operations of the inclination angle detection unit 1303 will be described in detail with reference to FIG. 14.

The inclination angle detection unit 1303 detects Euler angle information of the image display apparatus 1302. Euler angle information is composed of a roll angle 1401, a pitch angle 1402, and a yaw angle 1403 of the image display apparatus 1302. In a case where the display unit 104 of the image display apparatus 1302, which is vertically arranged is viewed from the front, the roll angle 1401 indicates a rotation angle around a vertical axis extending from the upper part to the lower part of the image display apparatus 1302, the pitch angle 1402 indicates a rotation angle around a horizontal axis passing through the right and left of the image display apparatus 1302, and the yaw angle 1403 indicates a rotation angle around an axis passing through from the front side to rear side of the image display apparatus 1302. Among detected Euler angle information, the roll angle 1401 and the pitch angle 1402 are outputted to the line-of-sight correction information calculation unit 1304 as inclination angle information ($\phi$, $\theta$).

Next, operations of the line-of-sight correction information calculation unit 1304 will be described in detail with reference to FIG. 15. The line-of-sight correction information calculation unit 1304 calculates line-of-sight correction information for correcting the line-of-sight direction using the inclination angle ($\phi$, $\theta$) detected by the inclination angle detection unit 1303. First, the inclination angle and the x-axis direction and the y-axis direction of an image are associated with each other. In a case where a relationship between an imaging unit and a display unit corresponds to a situation where an imaging unit 1502 is positioned above the display unit 1501, the inclination angle $\phi$ and the x-axis direction of the image are associated with each other, and the inclination angle $\theta$ and the y-axis direction 1504 of the image are associated with each other. In a case where a relationship between an imaging unit and a display unit corresponds to a situation where an imaging unit 1506 is positioned on the right side of the display unit 1505, the inclination angle $\theta$ and the x-axis direction 1507 of the image are associated with each other, and the inclination angle $\phi$ and the y-axis direction 1508 of the image are associated with each other. In a case where the inclination angle is 0, a line-of-sight correction amount ($\theta'_x$, $\theta'_y$) is set to (0,0) and a value of the line-of-sight correction amount ($\theta'_x$, $\theta'_y$) increases as the inclination angle increases. In this case, if an inclination angle with a maximum inclination angle size is held, it is possible to confirm a subject obtained by correcting the line-of-sight direction by inclining a terminal in a state where the inclination angle is 0, which is preferable.

Next, the operations of the image generation unit 1305 will be described in detail. The image generation unit 1305 generates an image in which a line-of-sight direction of a subject is corrected using line-of-sight information, line-of-sight correction information, a face model, and a captured image. In a case where line-of-sight correction information is ($\theta'_x$,$\theta'_y$) and line-of-sight information is ($\theta_x$,$\theta_y$), the image generation unit 1305 corrects the line-of-sight direction of the captured image by setting deviation between an imaging direction and a line-of-sight direction as ($\theta_x+\theta'_x$,$\theta_y+\theta'_y$).

Figure 16:
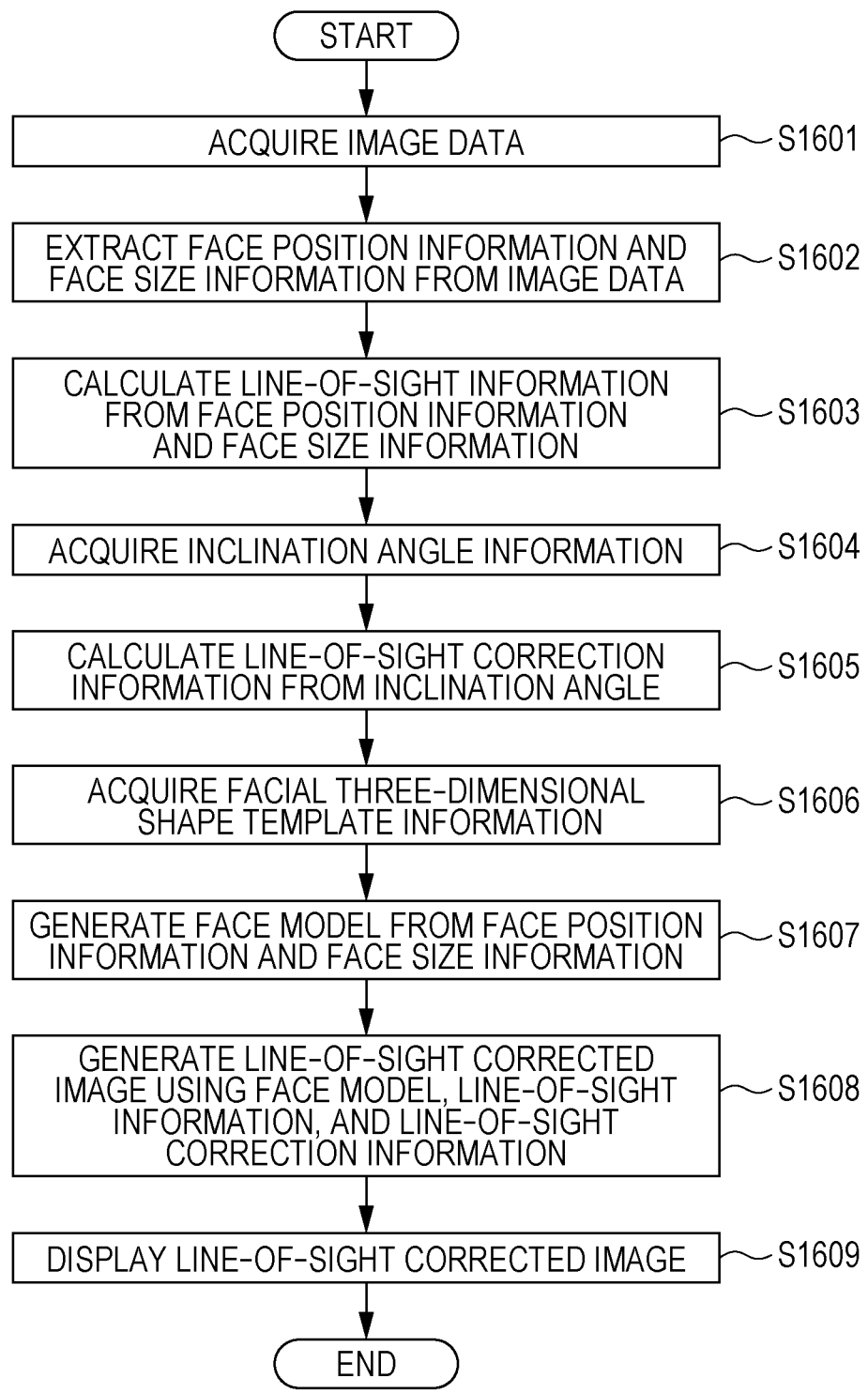
FIG. 16 is a flow chart illustrating a flow of image processing in the third embodiment of the present invention.

A flow of the above-described operations will be described with reference to a flowchart in FIG. 16.

First, in step S1601, the image processing device 1301 receives a captured image from the imaging unit 103. In step S1602, the face information detection unit 107 detects face information such as face size information and face position information from the captured image. In step S1603, the line-of-sight information calculation unit 108 calculates line-of-sight information of a subject using face information. In step S1604, the inclination angle detection unit 1303 acquires an inclination angle of the image display apparatus 1302. In step S1605, the line-of-sight correction information calculation unit 1304 calculates line-of-sight correction information from the inclination angle. In step S1606, the image processing device 1301 acquires three-dimensional facial shape template information from the storage unit 105. In step S1607, the face model generation unit 109 generates a face model. In the face model generation, three-dimensional facial shape template information is converted on the basis of face size information to generate the face model. In step S1608, the image generation unit 1305 generates an image by changing the line-of-sight direction of the subject using the face model, line-of-sight information, and line-of-sight correction information so that the line-of-sight direction of the subject in the captured image and the imaging direction match with each other. In step S1609, the image generation unit 1305 outputs the generated image to the display unit 104.

According to the image display apparatus 1302 provided with the above-described image processing device 1301 in the present invention, a line-of-sight correction amount of a user is changed according to the inclination angle and thus, the user can easily adjust the deviation of line-of-sight in the generated image, thereby making it possible to display a suitable image.

Fourth Embodiment

Figure 17:
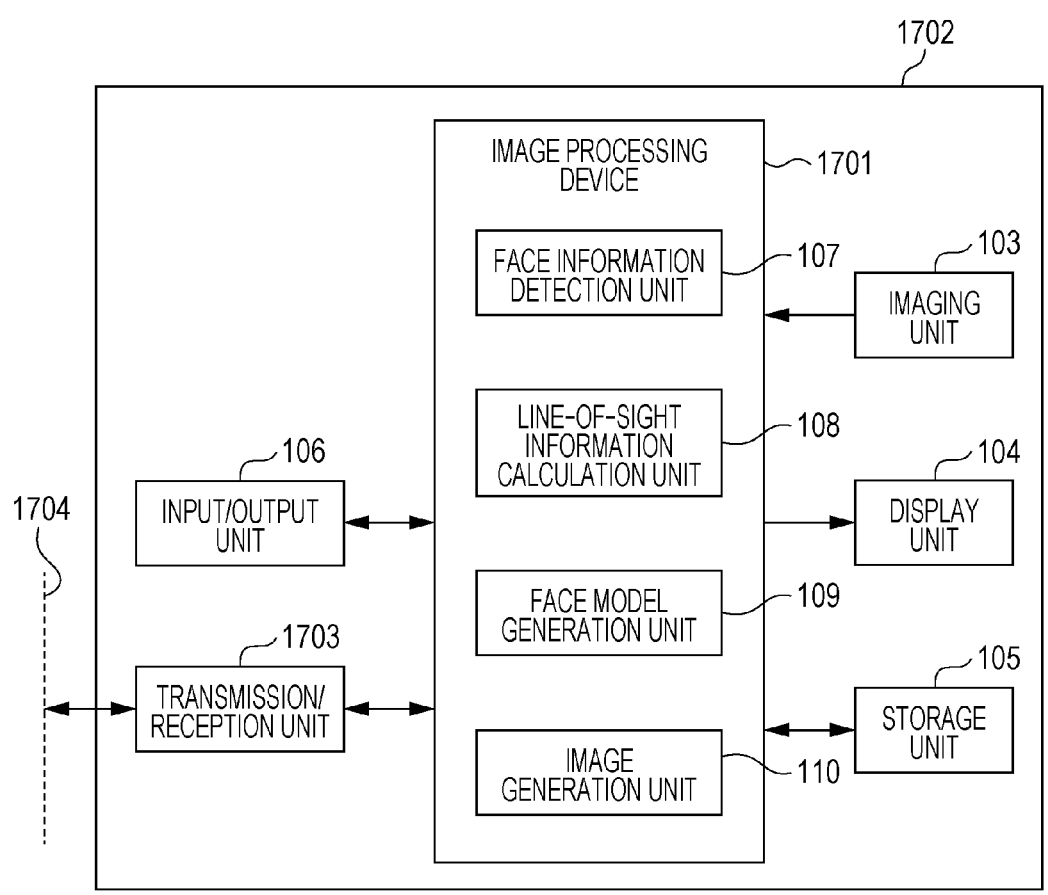
FIG. 17 is a functional block diagram illustrating an example of a configuration of an image display apparatus provided with an imaging unit and including an image processing device according to a fourth embodiment of the present invention.

Next, a configuration of an image display apparatus 1702 provided with an image processing device 1701 according to a fourth embodiment of the present invention will be described with reference to FIG. 17. In FIG. 17, the same constitutional elements as those of FIG. 1 are assigned the same reference numerals, the same processing as the embodiment of FIG. 1 is performed on the elements and thus, descriptions thereof will be omitted.

A difference between the present embodiment and the first embodiment is that the present embodiment has a configuration that includes a transmission/reception unit 1703. The image display apparatus 1702 is connected to an external network 1704 through the transmission/reception unit 1703 and is linked to other equipment. The transmission/reception unit 1703 is a cable, a communication unit of a mobile phone, or the like, and transmits and receives an image, face position information, face size information, and the like to and from the outside.

In the fourth embodiment, an image captured by the image display apparatus 1702, face position information, face size information, and the like are transmitted to another image display apparatus through the transmission/reception unit and an image captured by the other image display apparatus, face position information, face size information, and the like are received. That is, a captured image of a user 2 located at a remote site is displayed on the image display apparatus 1702 of a user 1 and a captured image of the user 1 is displayed on the image display apparatus of the user 2. Accordingly, this leads to a configuration capable of implementing a video chat system or a video conference system. Here, the image display apparatus 1702 which captures an image of the user 1 and the image display apparatus which captures an image of the user 2 are referred to as a first image display apparatus and a second image display apparatus, respectively, for discrimination.

Figure 18:
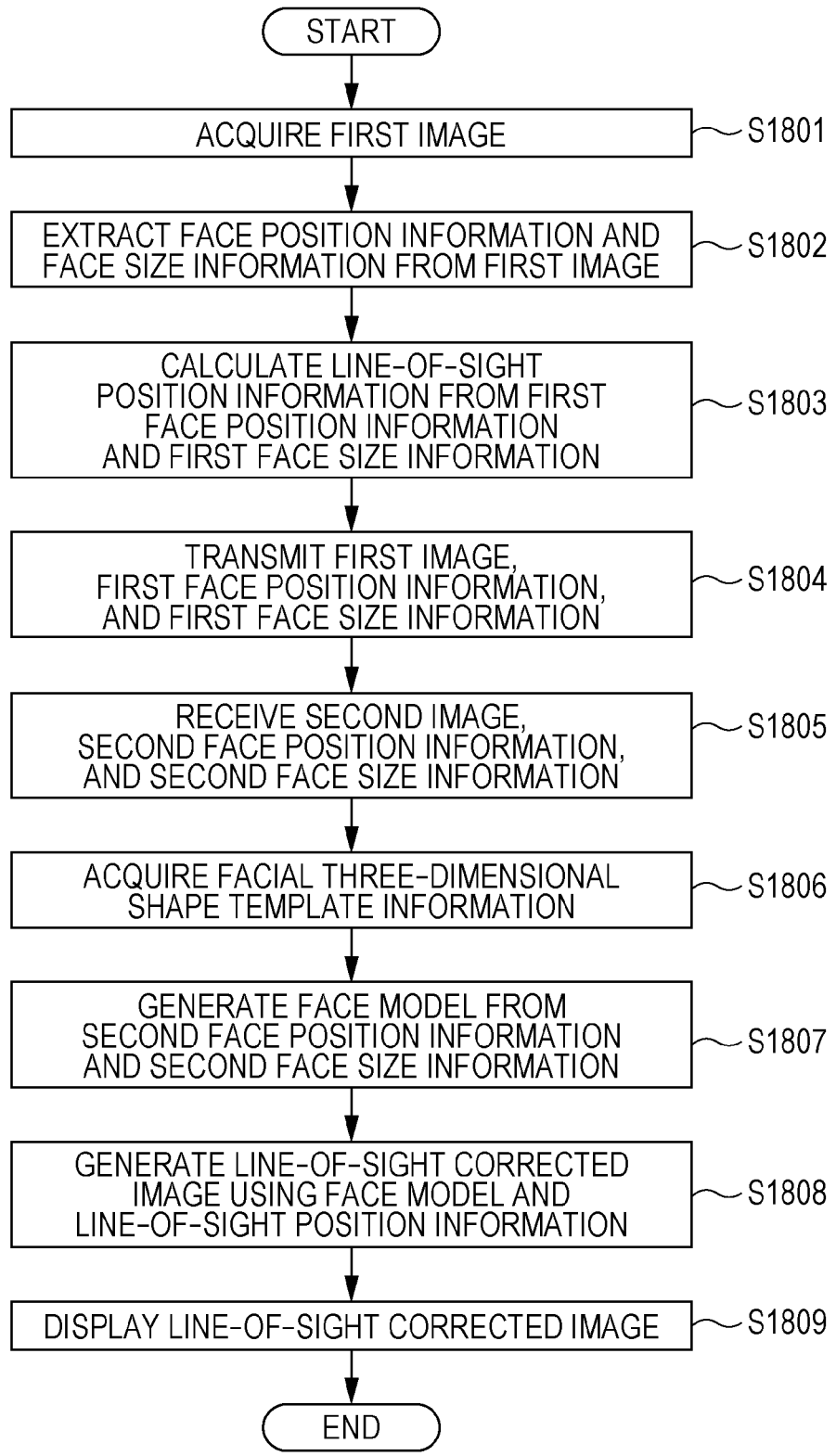
FIG. 18 is a flow chart illustrating a flow of image processing in the fourth embodiment of the present invention.

A flow of the above-described operations will be described with reference to a flowchart illustrated in FIG. 18.

First, in step S1801, the first image processing device receives a first image from the imaging unit 103. In step S1802, the face information detection unit 107 detects face information such as first face position information, first face size information, or the like from the first image. In step S1803, the line-of-sight information calculation unit 108 calculates first line-of-sight information of a subject using the face information. In step S1804, the transmission/reception unit 1703 transmits the first image, the first face position information, and the first face size information to the second image display apparatus. In step S1805, the transmission/reception unit 1703 receives the second image, second face position information, and second face size information. In step S1806, the first image processing device 1701 acquires three-dimensional facial shape template information from the storage unit 105. In step S1807, the face model generation unit 109 generates a face model. In the face model generation, the three-dimensional facial shape template information is converted on the basis of the second face position information and the second face size information, and the face model is generated. In step S1808, the image generation unit 110 generates an image by changing a line-of-sight direction of a subject so that a line-of-sight direction of a subject in the second image and an imaging direction match with each other, using the face model and first line-of-sight information. In step S1809, the image generation unit 110 outputs the generated image to the display unit 104. The image display apparatus 1702 according to the second embodiment operates as described above.

According to the image display apparatus 1702 provided with the image processing device 1701 in the present invention, in a case where the user 1 is in conversation with the user 2 through a video chat or video conference, or the like, a line-of-sight corrected image is generated from an image of the user 2 using line-of-sight information of the user 1 and a line-of-sight corrected image is generated from an image of the user 1 using line-of-sight information of the user 2. Therefore, it is possible to display a suitable image.

Fifth Embodiment

Figure 19:
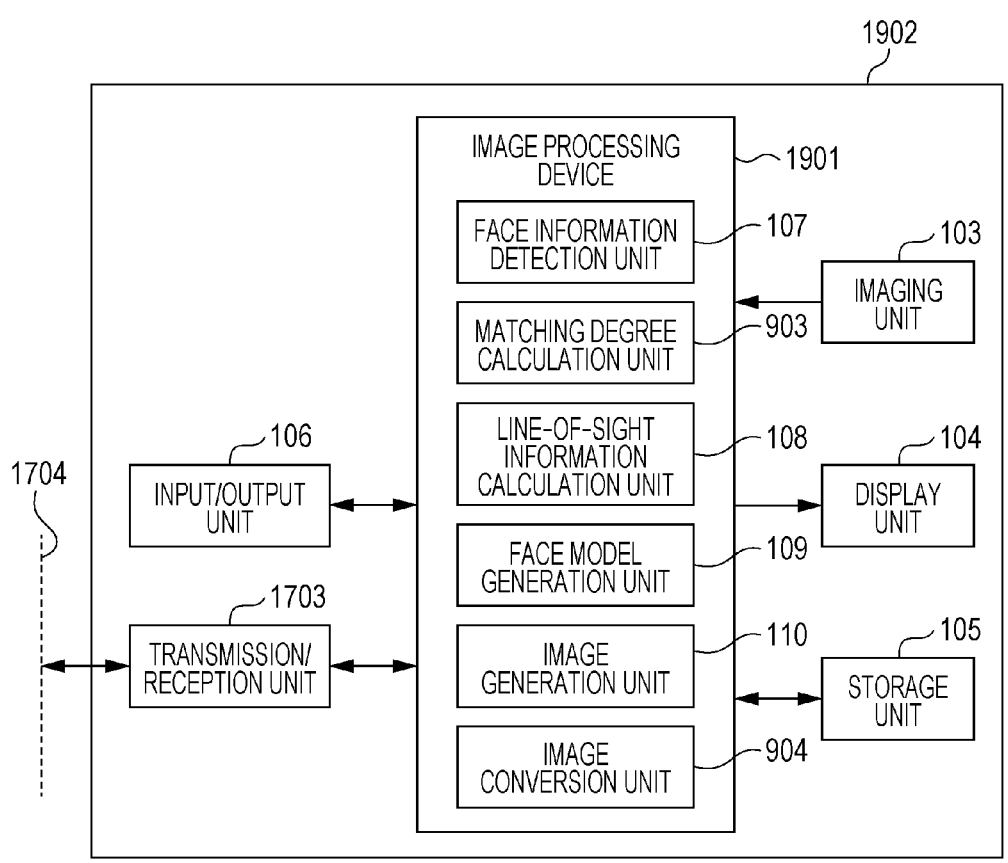
FIG. 19 is a functional block diagram illustrating an example of a configuration of an image display apparatus provided with an imaging unit and including an image processing device according to a fifth embodiment of the present invention.

Next, a configuration of an image display apparatus according to a fifth embodiment of the present invention will be described with reference to FIG. 19. In FIG. 19, the same constitutional elements as those of FIG. 1, FIG. 9, and FIG. 17, are assigned the same reference numerals, the same processing as the embodiments of FIG. 1, FIG. 9, and FIG. 17, are performed on the elements and thus, descriptions thereof will be omitted.

Differences between the present embodiment and the first, second, and fourth embodiments are that in the present embodiment, a first degree of suitability is calculated using first face information detected from an image captured by a first image display apparatus 1902 and the second image is converted using the first degree of suitability.

A flow of the above-described operations will be described with reference to a flowchart illustrated in FIG. 20.

First, in step S2001, a first image processing device 1901 receives a first image from the imaging unit 103. In step S2002, the face information detection unit 107 detects face information such as first face size information, first face position information, and the like from the first image. In step S2003, the line-of-sight information calculation unit 108 calculates first line-of-sight information of a subject using face information. In step S2003, the degree of suitability calculation unit 903 calculates the first degree of suitability. In step S2004, the transmission/reception unit 1703 transmits the first image, the first face size information, the first face position information, and the first degree of suitability to another image display apparatus. In step S2005, the transmission/reception unit 1703 receives a second image, second face size information, second face position information, and a second degree of suitability.

Next, in step S2006, it is determined whether or not the second degree of suitability is equal to or greater than a threshold value. In a case where it is determined that the second degree of suitability is equal to or greater than the threshold value, step S2007 to step S2014 are performed. In a case where it is determined that the second degree of suitability is less than the threshold value, step S2015 is performed. First, the operations for a case where the second degree of suitability is determined as being equal to or greater than the threshold value will be described. In step S2007, the line-of-sight information calculation unit 108 calculates first line-of-sight information from first face position information and first face size information. In step S2008, the image processing device 1901 acquires three-dimensional facial shape template information from the storage unit 105. In step S2009, the face model generation unit generates a face model using three-dimensional facial shape template information, second face position information, and second face size information. In step S2010, the image generation unit 110 generates a line-of-sight corrected image using the face model and first line-of-sight information. In step S2011, it is determined whether or not the first degree of suitability is equal to or greater than a threshold value. In a case where it is determined that the first degree of suitability is equal to or greater than a threshold value, in step S2012, the image generation unit outputs the generated image to the display unit 104. In a case where it is determined that the first degree of suitability is less than the threshold value, in step S2013, the image conversion unit converts the image using the first degree of suitability. In step S2014, the image conversion unit outputs the converted image to the display unit 104.

Next, the operations for a case where the second degree of suitability is determined as being less than a threshold value will be described. In step S2015, it is determined whether or not the first degree of suitability is equal to or greater than the threshold value. In a case where it is determined that the first degree of suitability is equal to or greater than the threshold value, the captured image is output to the display unit 104 in step S2016. In a case where it is determined that the first degree of suitability is less than the threshold value, in step S2013, the image conversion unit converts the image on the basis of the first degree of suitability. In step S2014, the image conversion unit outputs the converted image to the display unit 104.

The image display apparatus 1902 according to the fifth embodiment operates as described above.

According to the image display apparatus 1902 provided with the image processing device 1901 in the above-described present embodiment, in a case where the user 1 is in conversation with the user 2 through a video chat or video conference, or the like, a generated image and a captured image are displayed being switched with each other in such a way that the generated image is displayed in a case where an image is suitable for image generation and a captured image is displayed in a case where an image is not suitable for image generation, using the second degree of suitability of the user 2 so as to prevent an unsuitable image from being displayed. Therefore, it is possible to display a suitable image. Furthermore, an image conversion is performed on the second image using the first degree of suitability of the user 1 and thus it is possible to prompt the user 1 to capture an image of a face to be located in a region which is suitable for image generation.

The present invention is not intended to be limited by the above-described embodiments and various modifications may be made on the embodiments within a scope of matters set forth in claims and are regarded as being included in a technical scope of the present invention.

A program that runs on the image processing device according to the present invention may be a program (a program that causes a computer to function) that controls a CPU or the like so that functions of the embodiments according to the present invention are implemented. Information handled by the devices is temporarily accumulated in a Random Access Memory (RAM) while being processed, and then in various Read Only Memories (ROM) such as a ROM, or a HDD, so that the information is read-out, modified and written by the CPU as necessary.

A program for implementing functions of respective components illustrated in FIG. 1 may be recorded in a computer-readable recording medium, so that the program recorded in the recording medium is read by a computer system, and executed by the CPU or the like for processing of each unit. In the meantime, the "computer system" is assumed to include an Operating System (OS), hardware such as peripheral equipment, and the like. The "computer-readable recording medium" means a portable recording medium such as a flexible disk, a magneto-optical disk, a ROM, and a CD-ROM, and a storage device such as a hard disk built into a computer system, and the like. In addition, the "computer-readable recording medium" includes a medium that dynamically stores a program for a short period of time like a communication line which is used in a case where the program is transmitted through a communication line such as a telephone line or the like, or the network such as the Internet, and a medium that maintains a program for a predetermined period of time like a volatile memory within a computer system which functions as a client or a server in such a case.

A portion or entirety of the image processing device according to the above-described embodiments may be implemented by an LSI which is a typical integrated circuit. Each of functional blocks of the image processing device may be formed in an individual chip, and a part or all of the functional blocks may be integrated to form an individual chip. In addition, a method of achieving an integrated circuit is not limited to the LSI, and may be implemented with an exclusive circuit or a general processor. In a case where a technology of achieving an integrated circuit which can be an alternate of the LSI emerges due to advances in semiconductor technology, it is possible to use an integrated circuit by the technology.

In the above-described embodiments, only control lines and information lines considered as being needed for explanation are illustrated and all the control lines and information lines in a product are not necessarily illustrated. All the constitution elements may be connected with each other.

INDUSTRIAL APPLICABILITY

The present invention may be applied to an image processing device.

REFERENCE SIGNS LIST

101 IMAGE PROCESSING DEVICE
102 IMAGE DISPLAY APPARATUS
103 IMAGING UNIT
104 DISPLAY UNIT
105 STORAGE UNIT
106 INPUT/OUTPUT UNIT
107 FACE INFORMATION DETECTION UNIT
108 LINE-OF-SIGHT INFORMATION CALCULATION UNIT
109 FACE MODEL GENERATION UNIT

110 IMAGE GENERATION UNIT
903 DEGREE OF SUITABILITY CALCULATION UNIT
904 IMAGE CONVERSION UNIT
1304 LINE-OF-SIGHT CORRECTION INFORMATION CALCULATION UNIT
1306 IMAGE GENERATION UNIT
1703 TRANSMISSION/RECEPTION UNIT

All publications, patents and applications for those patents cited in the present are considered to be incorporated into the present application in their entirety as references.

The invention claimed is:

1. An image display apparatus comprising:
a first imaging lens and imaging element that image a first subject; and
a processor and associated memory, wherein the processor:
detects first face position information and first face size information of a subject from a first image captured by the first imaging lens and imaging element;
transmits the first image captured by the first imaging lens and imaging element, the first face position information, and the first face size information;
receives a second image of a second subject captured by other image display apparatus having a second imaging lens and imaging element, second face position information, and second face size information;
calculates first line-of-sight information from the first face position information and the first face size information; and
generates an image by correcting a direction of eyes of the second subject in the second image so that the direction of eyes is directed to the first imaging lens on a basis of the first line-of-sight information and a face model that is based on the first face position information, the first face size information, and three-dimensional facial shape template information representing a three-dimensional shape of a face.

2. The image display apparatus according to claim 1, further comprising:
a display that switches a process of displaying an image generated by the processor, a process of displaying an image converted by the processor, and a process of displaying the second image when displaying an image, based on a first degree of suitability and a second degree of suitability, wherein the processor:
calculates the first degree of suitability and indicates an extent to which the first image is suitable for image generation processing from the first face position information and the first face size information; and
generates an image by performing translation on the second image using the first degree of suitability.

3. An image processing device comprising:
a processor and associated memory, wherein the processor:
detects face position information and face size information of a subject from an input image;
calculates line-of-sight information of the subject; and
generates an image by correcting a direction of eyes of the subject in the input image so that the direction of the eyes is directed to an imaging lens that images the subject on a basis of the line-of-sight information and a face model that is based on the face position information, the face size information, and three-dimensional facial shape template information representing a three-dimensional shape of a face,
the imaging lens and an imaging element image the subject so that the input image is generated,
the processor calculates the line-of-sight information of the subject from the face position information, and the face size information, and
the line-of-sight information is information of the direction of eyes of the subject in the input image.

4. The image processing device according to claim 3, wherein the processor
calculates a degree of suitability indicating an extent to which a face region of the subject is suitable for image generation processing from the face position information and the face size information; and
generates the image by performing translation on the input image based on the degree of suitability, and
wherein a process of outputting the image generated by the processor and a process of outputting the image converted by the processor are switched with each other, based on the degree of suitability.

5. The image processing device according to claim 4, wherein the processor sets a region determined as being suitable for generating the image in a case where a captured image converted by the processor is displayed in a previous frame of the input image and a region determined as being suitable for generating the image in a case where an image generated by the processor is displayed in the previous frame of the image as different areas.

6. The image processing device according to claim 3, wherein the processor generates an intermediate face model by adjusting a distance histogram in the three-dimensional facial shape template information and enlarges and reduces the intermediate face model so that a vertical resolution and a horizontal resolution of the intermediate face model become equal to a vertical resolution and a horizontal resolution of a detected face region, respectively.

7. The image processing device according to claim 3, wherein
the processor detects an inclination angle of a display device
the processor calculates line-of-sight correction information for correcting a line-of-sight direction of the line-of-sight information, and
the processor calculates the line-of-sight correction information for the subject on the basis of the inclination angle.

8. The image processing device according to claim 3, wherein
the processor generates a corrected image in which the direction of the eyes of the subject is corrected using the line-of-sight information, the face model, and the image, and
the corrected image is obtained by converting positions of respective pixels of the input image in a three-dimensional space on the basis of the line-of-sight information by using distance data of a face corresponding to the input image, and generating an image in which the direction of the eyes of the subject is corrected.

9. The image processing device according to claim 8, wherein the image in which the direction of the eyes of the subject is corrected is obtained by correcting pixels on an image so that angular deviation in a horizontal direction is corrected based on deviation in an X-axis direction between the direction of the eyes of the subject in the input image and an imaging direction of the imaging lens and the imaging element and angular deviation in a vertical direction is corrected based on deviation in a Y-axis direction between the direction of the eyes of the subject in the input image and the imaging direction of the imaging lens and the imaging element.

* * * * *